US012717944B2

(12) United States Patent
Kumar et al.

(10) Patent No.: US 12,717,944 B2
(45) Date of Patent: Aug. 25, 2026

(54) DYNAMICALLY ASSIGNED FILE PERMISSION AND ACCESS

(71) Applicant: Dell Products, L.P., Round Rock, TX (US)

(72) Inventors: Shiv Kumar, Pune (IN); Anurag Sushil Chandra, Pune (IN); Avadut Mungre, Bicholim (IN)

(73) Assignee: DELL PRODUCTS L.P., Round Rock, TX (US)

( * ) Notice: Subject to any disclaimer, the term of this patent is extended or adjusted under 35 U.S.C. 154(b) by 96 days.

(21) Appl. No.: 18/768,200

(22) Filed: Jul. 10, 2024

(65) Prior Publication Data

US 2026/0017392 A1 Jan. 15, 2026

(51) Int. Cl.
*G06F 21/62* (2013.01)
*G06F 21/60* (2013.01)

(52) U.S. Cl.
CPC ........ *G06F 21/6209* (2013.01); *G06F 21/604* (2013.01)

(58) Field of Classification Search
CPC ........................... G06F 21/6209; G06F 21/604
See application file for complete search history.

(56) References Cited

U.S. PATENT DOCUMENTS

2008/0249816 A1* 10/2008 Khalilian ....... G06Q 10/063114 705/7.15
2018/0300494 A1* 10/2018 Avidan ................ G06F 18/2433
2019/0034648 A1* 1/2019 Avrahami ............... G06F 21/53
2023/0153427 A1* 5/2023 Croteau ................ G06F 21/554 726/22

* cited by examiner

*Primary Examiner* — Vance M Little
(74) *Attorney, Agent, or Firm* — Amin, Turocy & Watson, LLP

(57) ABSTRACT

The described technology is generally directed towards dynamically, and automatically, adjusting access to a file based on a detected change in an operating condition of the file. A change in an operating condition can be a trigger event, such that when a change is detected regarding the operating conditions, a policy defined for the file is reviewed and an action associated with the trigger event is identified and implemented for the file. A policy can define trigger events and actions relating to configuration of the file, one or more users having permission to access the file, a user accessing the file, a time-based operation of the file, and such. Accordingly, a status of the file can be automatically determined and utilized to control one or more permissions regarding the file.

20 Claims, 9 Drawing Sheets

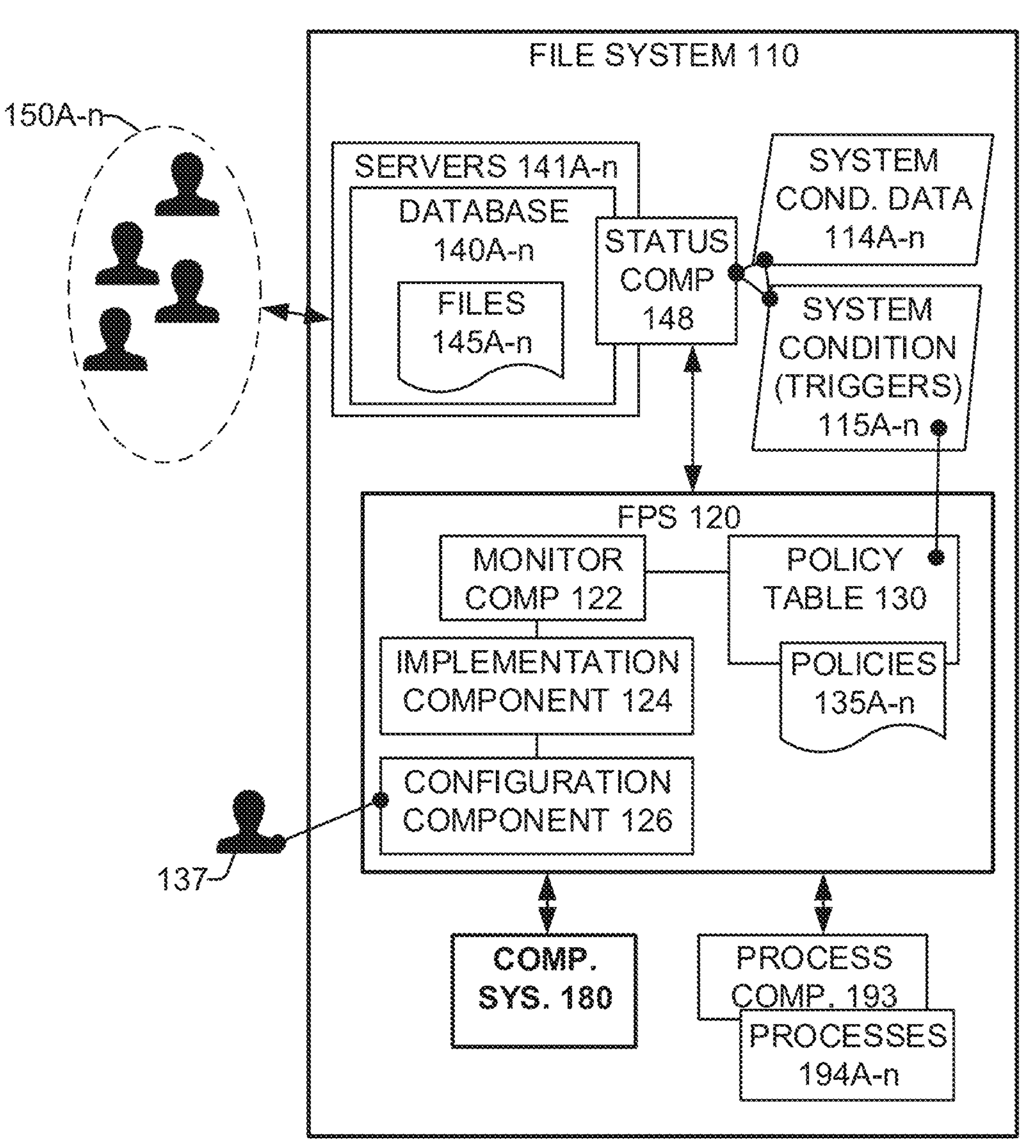
FIG. 1A

| POL | FILE | DIR. | USER(S) | TRIG. | M | ACT. | TRIG. | M | ACT. | TRIG. | M | ACT. |
|---|---|---|---|---|---|---|---|---|---|---|---|---|
| 135A | 145A | 140/141 | 150A, B, C | 115A | | 160A | 115B | | 160B | 115C | | 160C |
| 135A | 145B | 140/141 | 150A | 115D | | 160D | 115E | | 160E | - | - | - |
| 135B | 145C-F | 140/141 | ALL USERS 150A-n | 115F | | 160F | 115G | | 160G | 115H | | 160H |
| 135n | 145n | 140/141 | USERS 150D-F & H | 115I | | 160I | 115J | | 160J | - | - | - |

200A
130
1C
POL
FILE
DIR.
TRIG.
M
ACT.
TRIG.
M
ACT.
TRIG.
M
ACT.
1A
135A
145A
141A 140A
115A
Y
160A ALL
115B
N
160B: 150A-D
115C
N
160C: 150A/B
135B
145B
141C 140B
115D
Y
160D U:150A/B
115E
N
160E U:150A-C
2A
138A-n
138A-n
138A-n 200B
130
138A-n
138A-n
POL
FILE
DIR.
TRIG.
M
ACT.
TRIG.
M
ACT.
TRIG.
M
ACT.
1B
135A
145A
141A 140A
115A
N
160A ALL
115B
N
160B: 150A-D
115C
Y
160C: 150A/B
135B
145B
141C 140B
115D
N
160D U:150A/B
115E
Y
160E U:150A-C
2B
138A-n

200C 1D
130
POL
FILE
DIR.
TRIG.
M
ACT.
TRIG.
M
ACT.
TRIG.
M
ACT.
1A
135A
145A
141A 140A
115A
Y
160A ALL
115B 10AM
N
160B: 150A-D 10AM-12PM
115C
N
160C: 150A/B
138A-n
138A-n
138A-n

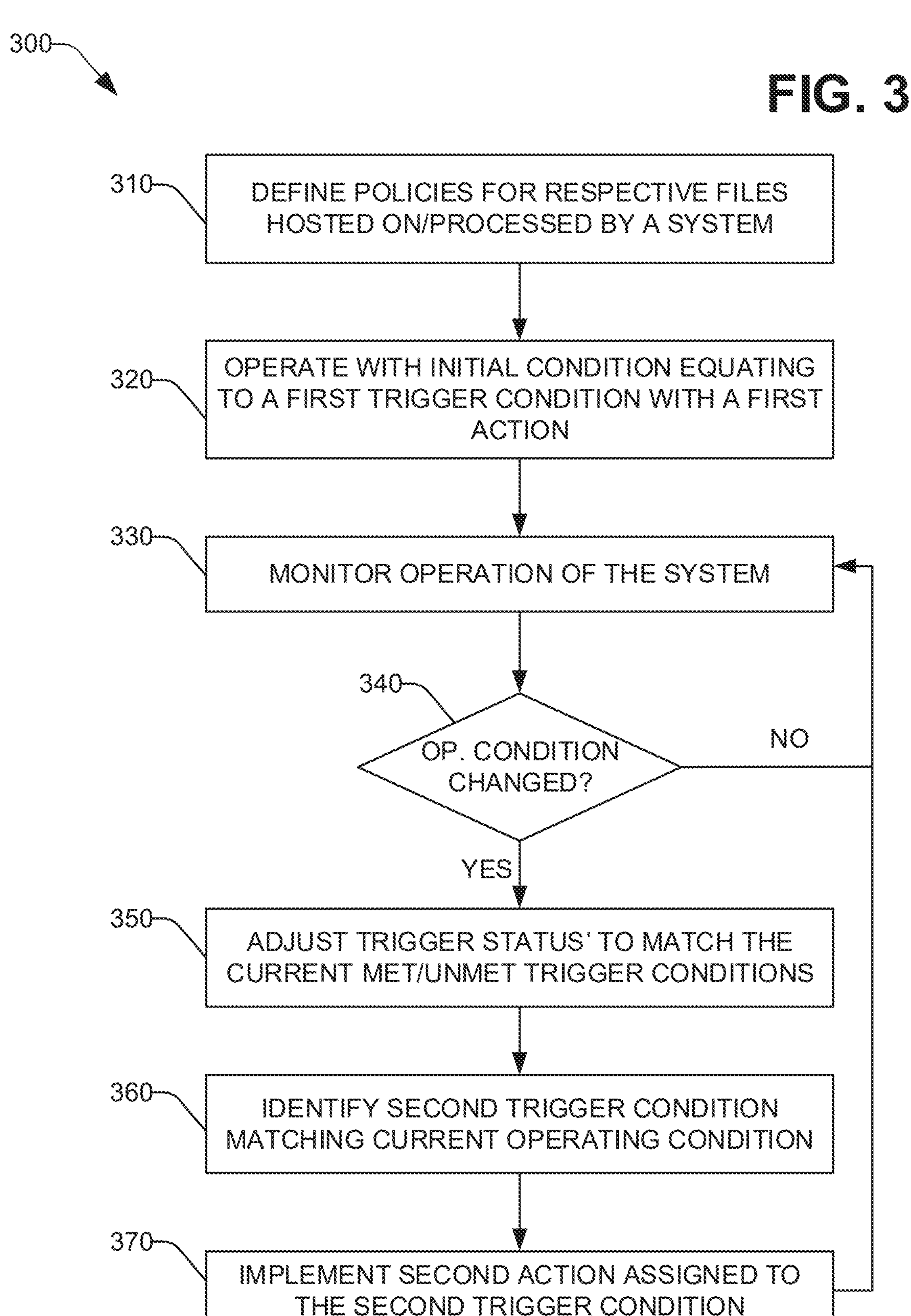
300
FIG. 3
310
DEFINE POLICIES FOR RESPECTIVE FILES HOSTED ON/PROCESSED BY A SYSTEM
320
OPERATE WITH INITIAL CONDITION EQUATING TO A FIRST TRIGGER CONDITION WITH A FIRST ACTION
330
MONITOR OPERATION OF THE SYSTEM
340
OP. CONDITION CHANGED?
NO
YES
350
ADJUST TRIGGER STATUS' TO MATCH THE CURRENT MET/UNMET TRIGGER CONDITIONS
360
IDENTIFY SECOND TRIGGER CONDITION MATCHING CURRENT OPERATING CONDITION
370
IMPLEMENT SECOND ACTION ASSIGNED TO THE SECOND TRIGGER CONDITION

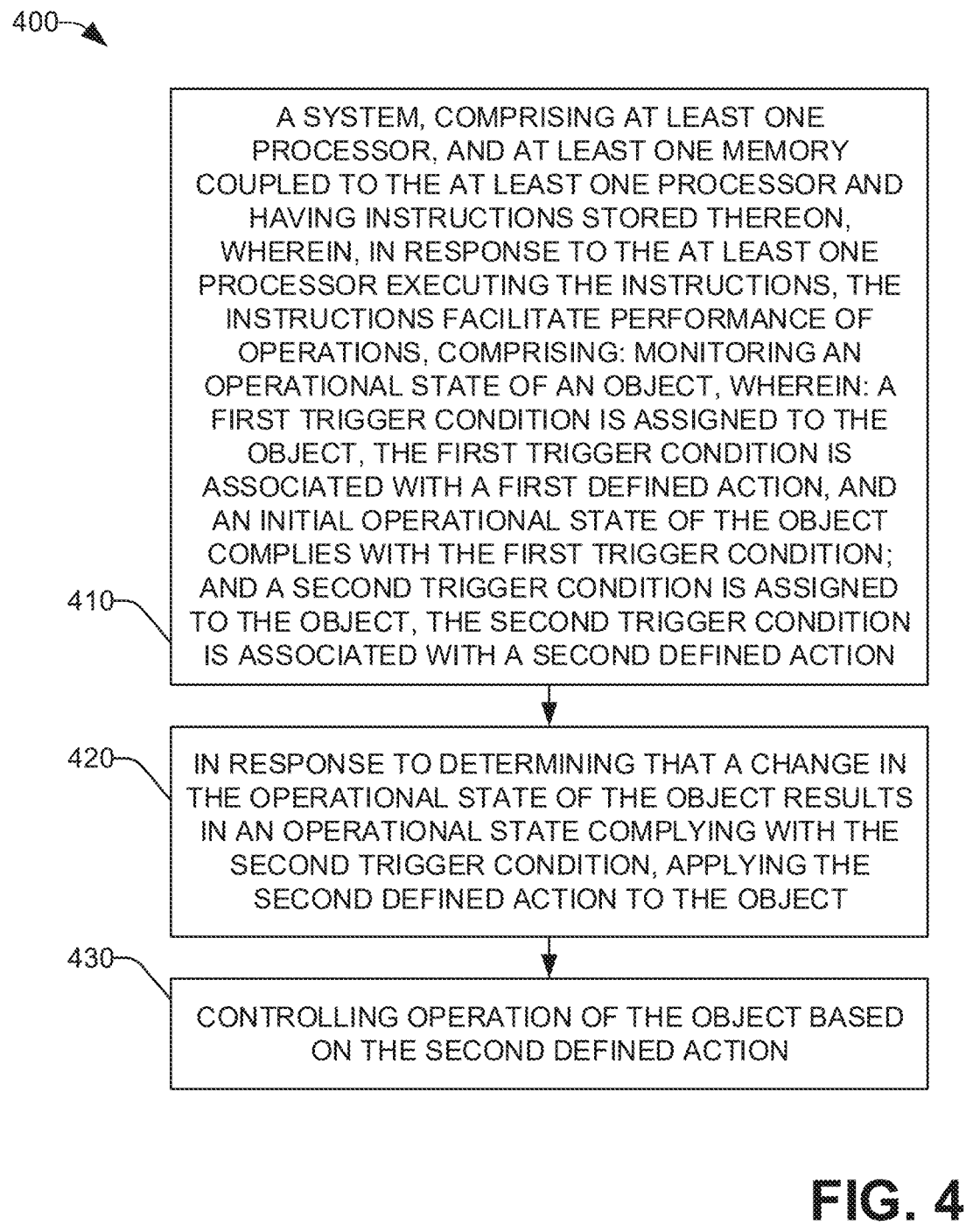

400

410 A SYSTEM, COMPRISING AT LEAST ONE PROCESSOR, AND AT LEAST ONE MEMORY COUPLED TO THE AT LEAST ONE PROCESSOR AND HAVING INSTRUCTIONS STORED THEREON, WHEREIN, IN RESPONSE TO THE AT LEAST ONE PROCESSOR EXECUTING THE INSTRUCTIONS, THE INSTRUCTIONS FACILITATE PERFORMANCE OF OPERATIONS, COMPRISING: MONITORING AN OPERATIONAL STATE OF AN OBJECT, WHEREIN: A FIRST TRIGGER CONDITION IS ASSIGNED TO THE OBJECT, THE FIRST TRIGGER CONDITION IS ASSOCIATED WITH A FIRST DEFINED ACTION, AND AN INITIAL OPERATIONAL STATE OF THE OBJECT COMPLIES WITH THE FIRST TRIGGER CONDITION; AND A SECOND TRIGGER CONDITION IS ASSIGNED TO THE OBJECT, THE SECOND TRIGGER CONDITION IS ASSOCIATED WITH A SECOND DEFINED ACTION

420 IN RESPONSE TO DETERMINING THAT A CHANGE IN THE OPERATIONAL STATE OF THE OBJECT RESULTS IN AN OPERATIONAL STATE COMPLYING WITH THE SECOND TRIGGER CONDITION, APPLYING THE SECOND DEFINED ACTION TO THE OBJECT

430 CONTROLLING OPERATION OF THE OBJECT BASED ON THE SECOND DEFINED ACTION

FIG. 4

DYNAMICALLY ASSIGNED FILE PERMISSION AND ACCESS

BACKGROUND

Generally, permissions available for a file(s) are statically set, e.g., by a file administrator, owner of the file, etc. Permissions can include who may access the file, what actions can be performed on the file, time of access, etc. However, it is common for use/configuration of a file to change during the lifetime of the file. Conventionally, the owner, file administrator, etc., has to initially manually assign/define the file permissions and subsequently manually change the permissions in accordance with the changing permission requirements/configuration of the file. Such manual permission updating/maintenance can lead to a myriad of access issues, for example, a delay in ability for a user to access a file, a file may be accessible when it should not be, the file admin may not be aware of the changing access requirement(s) of the file, and suchlike.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, configurations, apparatus, and/or computer program products are presented to automatically and dynamically adjust an operational condition of a computer object as a function of interaction, etc., with the computer object. In an embodiment, the operational condition is an access permission of a digital file.

According to one or more embodiments, a system is presented, wherein the system comprises at least one processor, and at least one memory coupled to the at least one processor and having instructions stored thereon, wherein the system can be configured to automatically change an operating condition of a digital object. In response to the at least one processor executing the instructions, the instructions facilitate performance of operations, comprising monitoring an operational state of an object, wherein, a first trigger condition can be assigned to the object, the first trigger condition can be associated with a first defined action, and an initial operational state of the object complies with the first trigger condition, and a second trigger condition can be assigned to the object, the second trigger condition can be associated with a second defined action. In an embodiment, the operations can further comprise, in response to determining that a change in the operational state of the object results in an operational state complying with the second trigger condition, applying the second defined action to the object. In another embodiment, the operations can further comprise, controlling operation of the object based on the second defined action.

In a further embodiment, the operations can further comprise, subsequent to the monitoring, applying and controlling, monitoring the operational state of the object, and wherein, in response to determining that the current operational state of the object complies with the first trigger condition, applying the first defined action to the object.

In another embodiment, the operations can further comprise: (a) updating the second trigger configuration with a third defined action, (b) further monitoring the operational state of the object, and (c) in response to determining that the updated second trigger configuration has been met, applying the third defined action.

In an embodiment, the object can be at least one of a computer object, a computer file, a computer application, a video file, a video application, a digital music file, a digital music application, a digital image, a text file, or a data resource.

In an embodiment, the first trigger condition can be a function of at least one of a first time, a first configuration of the object, a threshold value, or a first parameter. In another embodiment, the second trigger condition can be a function of at least one of a second time, wherein the second time and the first time are disparate; a second configuration of the object, wherein the second configuration of the object and the first configuration of the object are different configurations; or a second parameter, wherein the first parameter and the second parameter are different parameters.

In an embodiment, the instructions comprise a Daemon software application.

In another embodiment, the operations can further comprise, defining a policy, wherein the policy comprises: first data representative of the first trigger condition assigned to the object and the first defined action, and second data representative of the second trigger condition assigned to the object and the second defined action.

In a further embodiment, the operations can further comprise, in response to determining that the operational state of the object complies with the second trigger condition, applying a met status condition for the second trigger condition, and an unmet status condition for the first trigger condition.

In another embodiment, wherein the object is a first object, the operations can further comprise: (a) identifying an access permission policy to be created for a second object, (b) determining that the second object is similar to the first object according to a similarity criterion, (c) identifying, for the first object, the first trigger condition, the first defined action, the second trigger condition, and the second defined action, and (d) generating the access permission policy for the second object, wherein the access permission policy can comprise at least one of the first trigger condition, the first defined action, the second trigger condition, or the second defined action.

In a further embodiment, the object is a first object and the first object can be associated with at least one other object other than the first object, and, in response to the second defined action being applied to the first object, the second defined action can be applied to the at least one other object associated with the first object.

In further embodiments, a computer-implemented method is provided, wherein the method comprises monitoring, by a device comprising at least one processer, one or more conditions associated with a file and further determining, by the device, occurrence of a first trigger event associated with the one or more conditions associated with the file. The method can further comprise, reviewing, by the device, a policy defined for the file, wherein the policy comprises a first action to implement in response to the occurrence of the first trigger event, and further implementing, by the device, the first action, wherein the first action applies a first access permission to the file.

In an embodiment, the method can further comprise, (a) further monitoring, by the device, the one or more conditions associated with a file, (b) determining, by the device, occurrence of a second trigger event associated with the one or more conditions associated with the file, (c) reviewing, by the device, the policy defined for the file, wherein the policy can comprise a second action to implement in response to the occurrence of the second trigger event, and (d) implementing, by the device, second first action, wherein the second action applies a second access permission to the file.

In an embodiment, the first access permission can comprise at least one of changing a user access, a file write permission, a file read permission, a file modify permission, a file save permission, or a file close permission.

In another embodiment, the first file can be included in a set of files, and the first action is applied to the set of files.

In a further embodiment, the trigger event can comprise at least one of: a defined user has accessed the file, a defined user has edited the file, a time event relating to the file has occurred, a maximum number of users have accessed the file, a rate of data transfer from the server hosting the file is below a threshold amount, a defined financial amount has been met, or a threshold parameter has been met.

Further embodiments can include a computer program product stored on a non-transitory computer-readable medium and comprising machine-executable instructions, wherein in response to being executed, the machine-executable instructions cause a system to perform operations, comprising receiving a first event trigger, wherein the first event trigger indicates a first change in operational condition of a file, identifying a first action defined for the first event trigger, wherein the first action is a first access permission, and further configuring the file with the first access permission.

In an embodiment, the operations can further comprise receiving a second event trigger, wherein the second event trigger can indicate a second change in operational condition of a file, further identifying a second action defined for the second event trigger, wherein the second action can be a second access permission, and further configuring the file with the second access permission.

In an embodiment, the first event trigger or the second event trigger can be one of a defined user has accessed the file, a defined user has edited the file, a time event relating to the file has occurred, a maximum number of users have accessed the file, a rate of data transfer from the server hosting the file is below a threshold amount, a defined financial amount has been met, or a threshold parameter has been met.

In another embodiment, the first access permission or the second access permission can comprise a first specification that a user of a defined number of users is able to access the file, a second specification that no users can access the file, or a third specification that one or more users are able to access the file for a defined period of time.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1A presents an example system configured to dynamically adjust a property of a file in response to a trigger being activated, in accordance with one or more embodiments.

FIG. 3 presents an example computer-implemented method for dynamically implementing/adjusting access permissions to one or more files, in accordance with one or more embodiments.

FIG. 4 presents an example computer-implemented method for automatically adjusting file permissions for a file, in accordance with an embodiment.

DETAILED DESCRIPTION

Figure 1B:
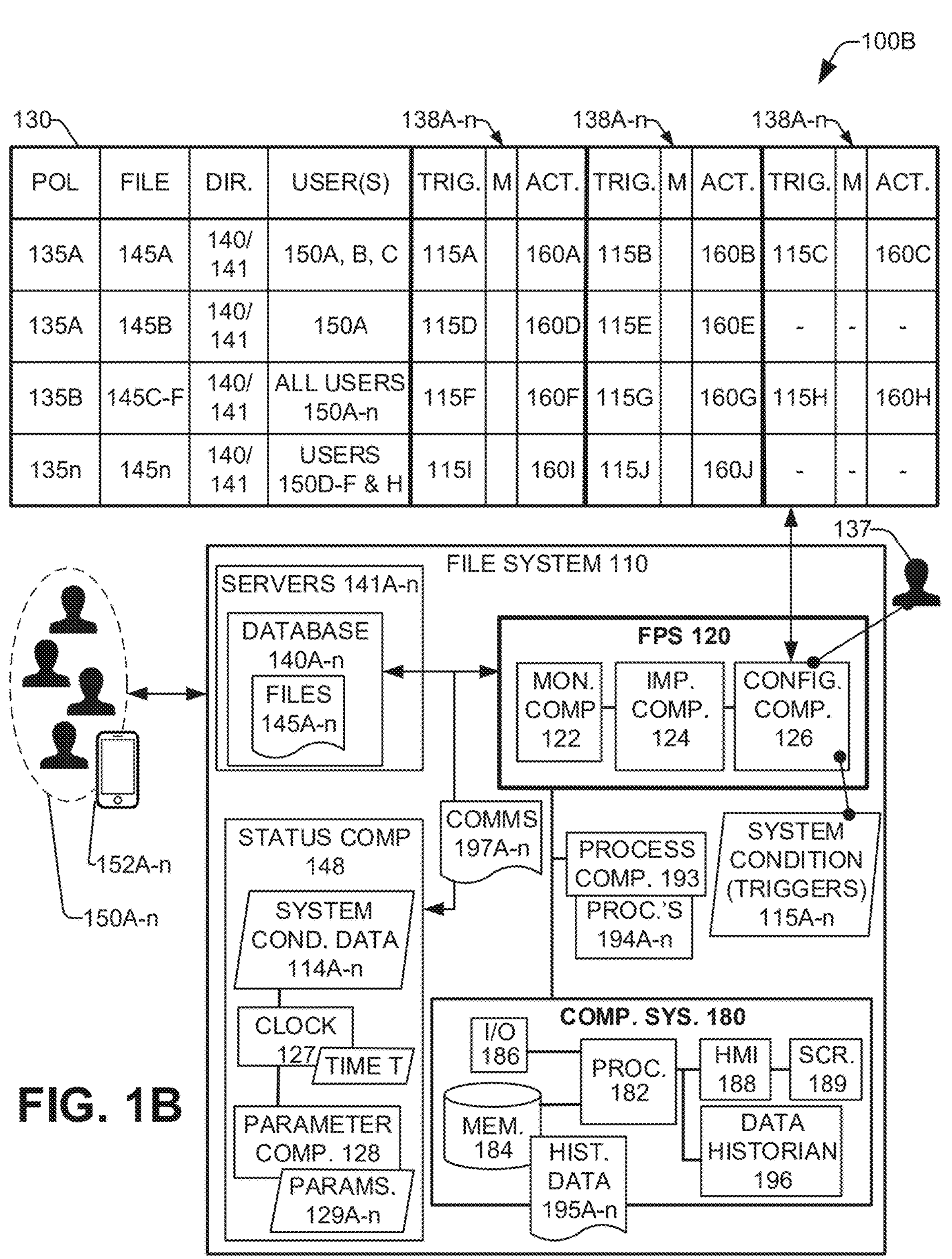
FIG. 1B presents an example schematic further developing concepts and embodiments presented regarding the file system presented in FIG. 1A, in accordance with one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

1. Overview

As previously mentioned, file access/permissions are conventionally set manually for a file, whereby an owner and/or file administrator (aka admin), and such, initially set the file access/permissions, and, at a later time, in response to a change in the access requirement(s), the admin has to manually update/set the file with the new access requirement (s). Manual adjustment of the file access permission(s) can be an onerous process (e.g., extensive paper trail of requested updates between file owner and admin), fraught with neglected permission updates, etc. Conventional file permissions are static, for example, if a user has been given a read permission to access a file, the user will always have the read permission unless the permission is changed/revoked by the file owner/admin.

Per the various embodiments presented herein, a trigger condition (aka trigger event, system condition) can be assigned to a file such that, with the file having an initial state, once the trigger has been identified/activated, an initially set file access/permission can be automatically updated in accordance with a file access/permission assigned to the trigger condition.

In an embodiment, a file permission system can be configured to monitor the file(s) to determine whether a trigger condition(s) has been met, and in response to determining the trigger condition has occurred, the file permission system can be configured to implement an access, permission, etc., assigned to the trigger condition. In an aspect, the file permission system automatically manages access to the one or more files.

Accordingly, the file permissions/access can be adjusted dynamically, in an automated real-time manner, based on identifying occurrence of a trigger condition with a corresponding action implemented (e.g., file access becomes limited, file access becomes broadened, and such).

2. File Permission System

FIG. 1A, presents an example schematic of a system 100A configured to dynamically adjust a property of a file in response to a trigger being detected/activated, in accordance with one or more embodiments. The term n, as used herein is any positive integer.

As shown, a file system 110 includes a file permission system (FPS) 120 configured to monitor and control access, etc., to various files 145A-n stored in one or more file databases/storage devices 140A-n, which may be located on one or more servers 141A-n.

Operational status of any of the files 145A-n, databases/storage devices 140A-n, and/or servers 141A-n can be monitored by a status component 148 local/remote to files 145A-n, databases/storage devices 140A-n, and/or servers 141A-n. Status component 148 can be configured to compile/generate system condition data 114A-n (a.k.a., system operation data) representing a current operational status of any of the files 145A-n, databases/storage devices 140A-n, and/or servers 141A-n. Status component 148 can be further configured to transmit/forward the system condition data 114A-n to the FPS 120. System condition data 114A-n can relate to file operations (e.g., open, read, write, change, modify, delete, save, close, and such), file access (e.g., a user 150A-n has accessed and read, or edited/write to a file 145A-n), time of file access, operational status of the databases/storage devices 140A-n, servers 141A-n, and such. Files 145A-n can be any computer-based/digital content, such as a digital object.

FPS 120 can include a monitor component 122 configured to monitor operation of the file system 110 via the system condition data 114A-n in comparison with system conditions 115A-n defined in a policy 135A-n, as further described. In an embodiment, monitor component 122 can be configured to compare the received system condition data 114A-n with a system condition 115A-n (trigger condition, trigger event) to determine a current operational status of any of the files 145A-n, databases/storage devices 140A-n, and/or servers 141A-n, whereby the system conditions 115A-n can function as event triggers on which subsequent decisions are made regarding implementation of a policy 135A-n. FPS 120 can further include an implementation component 124 configured to implement, based on the one or more trigger conditions 115A-n, one or more policies 135A-n regarding access, etc., of the one or more files 145A-n.

Policies 135A-n can be defined in a policy table 130, whereby the policies 135A-n can be configured (e.g., via configuration component 126) by admin 137, whereby admin 137 can be an owner of the files 145A-n, a file administrator, etc. Policies 135A-n can be utilized to control access of/interaction with the files 145A-n by one or more users/entities 150A-n. Policy table 130 and policies 135A-n can comprise respective data representative of the various trigger conditions 115A-n, trigger status' 138A-n, actions 160A-n, and the like, regarding one or more files 145A-n and one or more users 150A-n.

As further described, monitor component 122 (a.k.a. first component, or first application) can be configured to monitor one or more trigger conditions 115A-n assigned to a file 145A-n (e.g., in policy table 130), and, in response to the monitor component 122 determining/detecting the trigger condition 115A-n has occurred (e.g., per comparison of the received system condition data 114A-n versus a trigger condition 115A-n), the monitor component 122 can change a trigger condition 115A-n from not met (N) to met (Y) (e.g., event status 138A-n, per FIG. 1B). In response to the trigger condition 115A-n being updated to met, implementation component 124 (a.k.a. second component, or second application) can be implemented to review the policy table 130/policies 135A-n, identify and implement an action 160A-n assigned to the file 145A-n having a triggered condition 115A-n of met. In an example embodiment, monitor component 122 and implementation component 124 can be configured as background operations, e.g., computer processes that run in the background without any user intervention (e.g., without intervention by admin 137, users 150A-n, and such). In an example embodiment, monitor component 122 and/or implementation component 124 can be a Daemon application. As further described, system 110 can include/be communicatively coupled to a computer system 180.

It is to be appreciated that while the foregoing relates to a received system condition data 114A-n/trigger condition 115A-n of a file 145A-n being monitored, with the action 160A-n subsequently implemented, the various embodiments presented herein can be equally applied to a set/group/collection of files 145A-n. A file 145A-n can be an executable file. File 145A-n can be any data resource, such as written content/text file, an image, a video file, a music file, a computer program, a computer file, a computer application, digital content, and the like. Further, while the various embodiments are presented with regard to a computer-based/digital file 145A-n, the various embodiments are not so limited and can be equally applied to any computer-based/digital object.

FIG. 1B presents an example schematic 100B further developing concepts and embodiments presented regarding the file system presented in FIG. 1A, in accordance with one or more embodiments.

As shown in FIG. 1B, admin 137 can configure the policy table 130 with various settings/configurations for policies 135A-n. A respective policy 135A-n in the set of policies 135A-n can be configured with the following information:

a filename, e.g., of file 145A-n in conjunction with the directory/(aka location/filepath) of the file 145A-n, wherein the directory can define stored location of file 145A-n, e.g., server 141A-n and/or database 140A-n. Further, for each policy 135A-n, one or more users 150A-n associated with a policy 135A-n/file 145A-n, wherein as further described, as respective triggers 115A-n are identified/implemented, respective users 150A-n can be granted access permission to a file 145A-n can be changed from no users, a single user, multiple users, etc. For each policy 135A-n, two or more trigger conditions 115A-n can be implemented, whereby each trigger condition 115A-n can have an associated action 160A-n.

Hence, as a trigger condition 115A-n is determined to have been met, e.g., by monitor component 122 identifying a match between a trigger condition 115A-n and received system condition data 114A-n, the monitor component 122 can set a flag/status 138A-n associated with the trigger condition 115A-n as being met (setting the prior determined trigger condition to unmet) and the implementation component 124 identifies and implements the action 160A-n associated with the met trigger condition 115A-n.

Users 150A-n can interact with file system 110 and files 145A-n via respective computer devices (e.g., devices 152A-n, portable laptops, mobile phones, portable tablet PC's, and the like). For example, based on an access permission (e.g., in a current action 160A-n), users 150A-n can view files 145A-n on their device 152A-n, perform interactions such as edit/write to a file 145A-n, read file 145A-n, and such. As mentioned, files 145A-n can be made available to users 150A-n/devices 152A-n based on time, user activity, and the like.

A clock 127 can be utilized to enable time-based access, wherein the clock 127 can be a system clock configured to provide a time T, e.g., current time of operation of servers 141A-n/database systems 140A-n, file system 110, and the like. Clock 127 can be located at any of the storage system 140A-n, servers 141A-n, status component 148, FPS 120, and/or computer system 180, such that the clock 127 can be utilized to (a) provide a local time of the storage system 140A-n/servers 141A-n, or (b) provide a local time at status component 148/FPS 120.

A parameter component 128, and associated parameters 129A-n, can be included in status component 148, enabling various parameters 129A-n to be monitored and utilized to establish a trigger condition 115A-n. For example, a financial parameter 129A-n can be utilized to establish actions 160A-n based on monetary transactions being made (e.g., a defined/threshold amount of money is to be raised from charging for access to the files 145A-n, and once the threshold is reached, access to the files 145A-n is terminated). In another example, a bandwidth parameter 129A-n can be utilized to establish actions 160A-n to control access to files 145A-n as a function of available bandwidth to download/access files 145A-n at servers 141A-n, storage system 140A-n, etc.

Various communications 197A-n can be utilized across file system 110, between FPS 120 (and included components), servers 141A-n, databases 140A-n (and associated memory stores), and computer system 180. Communications 197A-n can include notifications, instructions, status updates, selections, data, information (e.g., operating condition of files 145A-n, databases 140A-n, data servers 141A-n, system condition data 114A-n, trigger conditions 115A-n, trigger condition status' 138A-n, actions 160A-n, and such), and the like.

As shown in FIG. 1B, any of the components (e.g., file system 110, monitor component 122, implementation component 124, configuration component 126), file storage systems (e.g., servers 141A-n and database systems 140A-n), process component 193 (as further described below), etc., can be communicatively coupled to a computer system 180. The computer system 180 can comprise a processor 182 and a memory 184, wherein the processor 182 can execute the various computer-executable components, functions, operations, etc., presented herein, e.g., any of components in FPS 120, monitor component 122, implementation component 124, configuration component 126, parameter component 128, process component 193, and such. The memory 184 can be utilized to store the various computer-executable components, functions, code, etc., as well as information regarding any of files 145A-n, operational state of files 145A-n, servers 141A-n, and/or databases 140A-n, system condition data 114A-n, activity of users 150A-n, vectors $V_{1-n}$, similarity indexes $S_{1-n}$, processes 194A-n (as further described below), historical data 195A-n, and suchlike.

As further shown, computer system 180 can include an input/output (I/O) component 186, wherein the I/O component 186 can be a transceiver configured to enable transmission/receipt of information and data between any of the components included in file system 110. I/O component 186 can be communicatively coupled to the remotely located devices and systems, e.g., computer systems/devices 152A-n implemented by users 150A-n to interact with file system 110 and files 145A-n (e.g., download file, read file, write file, and such). In an embodiment, I/O component 186 can be configured to transmit various communications 197A-n regarding files 145A-n, e.g., regarding access/availability of the files 145A-n.

In an embodiment, the computer system 180 can further include a human-machine interface (HMI) 188 (e.g., a display, a graphical-user interface (GUI)) which can be configured to present various information including any of files 145A-n, databases 140A-n, servers 141A-n, communications 197A-n, etc., per the various embodiments presented herein. The HMI 188 can include an interactive display 189 to present the various information via various screens presented thereon, and further configured to facilitate input of policies 135A-n and configurations, information/settings/etc., regarding the files 145A-n, system condition data 114A-n, trigger conditions 115A-n, trigger status' 138A-n, actions 160A-n, etc.

File system 110 can further include a data historian 196 configured to compile historical data 195A-n (e.g., prior and/or current data/information/knowledge) regarding operation of file system 110 and respective components included therein, e.g., FPS 120, storage systems (databases 140A-n, servers 141A-n), system condition data 114A-n, trigger conditions 115A-n, files 145A-n, users 150A-n and their activity, trigger condition statuses 138A-n, actions 160A-n, and such with regard to utilizing policies 135A-n and event triggers 115A-n to dynamically/automatically control access and permissions relating to files 145A-n on file system 110.

File system 110 can further include a process component 193 and processes 194A-n. In an embodiment, processes 194A-n can include artificial intelligence (AI) and machine learning (ML) processes which can be utilized monitor/recommend policies 135A-n, trigger conditions 115A-n, actions 160A-n, and the like, regarding dynamically/automatically controlling access and permissions relating to files 145A-n on file system 110, as further described.

It is to be appreciated that while process component 193 and processes 194A-n, data historian 196 and historical data 195A-n are depicted as being included/coupled to computer system 180, process component 193 and processes 194A-n, data historian 196 and historical data 195A-n and be located and implemented at any suitable location/activity/process undertaken across file system 110.

Figures 2A, 2B, 2C:
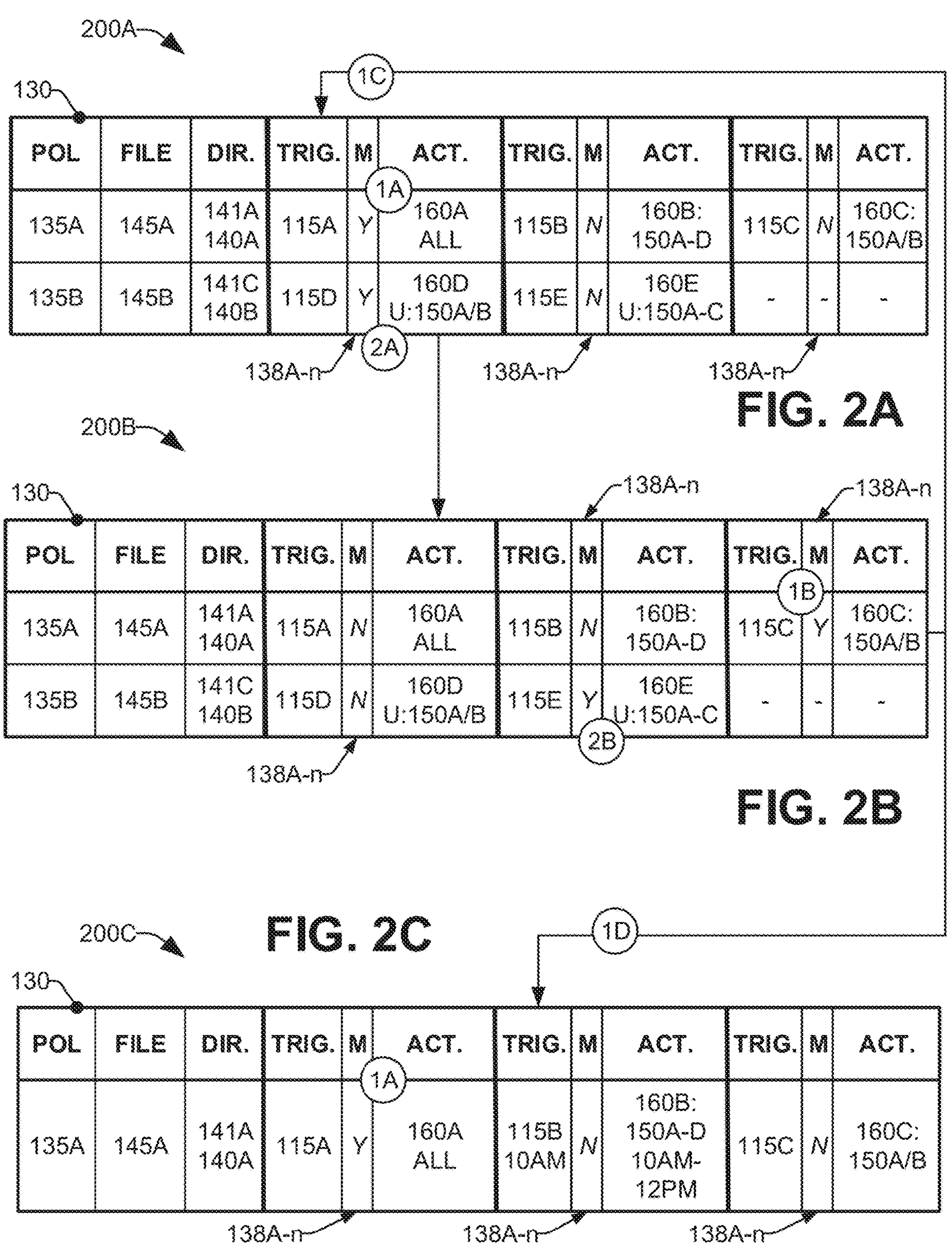
FIGS. 2A-2C illustrate respective example trigger conditions being implemented and access to the respective files being adjusted in accordance with an implemented policy, in accordance with one or more embodiments.

Turning to FIGS. 2A-2C, example schematics 200A-200C illustrate policies being dynamically implemented in response to trigger conditions/events occurring, in accordance with at least one embodiment. FIGS. 2A-2C illustrate implementation of a policy table 130, where the number of entries (e.g., policies 135A-n) in the policy table 130 can be as extensive as required to enable a myriad of access permissions (e.g., in actions 160A-n) to be applied to files 145A-n.

As shown in FIG. 2A, policy 135A is assigned to a file 145A located at database 140A hosted on server 141A. Policy 135A comprises three trigger conditions 115A, 115B, and 115C. Trigger condition 115A has an associated action 160A with all users 150A-n having access to file 145A when trigger condition 115A is met. Trigger condition 115B has an associated action 160B with user access limited to users 150A-D having access to file 145A when trigger condition 115B has been met. Trigger condition 115C has an associated action 160C with only users 150A and B having access to file 145A when trigger condition 115C has been met.

As further shown in FIG. 2A, policy 135B is assigned to a file 145B located at database 140B hosted on server 141C. Policy 135B comprises only two trigger conditions 115D and 115E. Trigger condition 115D has an associated action 160D with users 150A and 150B having access to file 145B when trigger condition 115D is met. Trigger condition 115E has an associated action 160E with user access expanded to users 150A-C having access to file 145B when trigger condition 115E has been met.

Respective steps 1A-2B in FIGS. 2A-2C illustrate respective trigger conditions being implemented and access to the respective files being adjusted in accordance with an implemented policy, in accordance with one or more embodiments. Per FIG. 2A, step 1A, system 110 initially is operating under conditions, e.g., per system condition data 114A, equating to the trigger condition 115A, such that monitor component 122 makes a determination that status 138A=YES/met, and system 110 is operating under trigger condition 115A.

Accordingly, action 160A is implemented by implementation component 124 with all users 150A-n having access to file 145A. Trigger conditions 115B and 115C are determined (e.g., by monitor component 122) to have NOT been met. Per FIG. 2B, step 1B, operating conditions of system 110 have been determined by monitor component 122 to have changed, e.g., newly received system condition data 114C is determined to be different to the prior system condition data 114A. Alternatively, status component 148 can send a notification 197A indicating that status component 148 has determined a current operation (e.g. per system condition data 114C) is different to the previous system operation (e.g., per system condition data 114A), whereby, notification 197A can include an indication of the operational change in combination with the system condition data 114A and the system condition data 114C.

Monitor component 122 determines the newly received system condition data 114C to be different to the prior system condition data 114A, with the current operating conditions (e.g., per the newly received system condition data 114C) equates to the trigger condition 115C. In response to a determination that the operating conditions of system 100A/B have changed, monitor component 122 makes a determination that status 138C=YES/met, and system 110 is operating under trigger condition 115C. Accordingly, action 160C is implemented by implementation component 124 with only users 150A and 150B now having access to file 145A. Monitor component 122 determines trigger condition 115A, status 138A is NO longer met, and trigger condition 115B is determined to have NOT been met.

Per FIG. 2A, step 2A, with regard to file 145B, system 110 is also initially operating under conditions, e.g., per initial system condition data 114D, equating to the trigger condition 115D, such that monitor component 122 makes a determination that status 138D=YES/met, and system 110 is operating under trigger condition 115D. Accordingly, action 160D is implemented by implementation component 124 with users 150A and 150B having access to file 145A. Trigger condition 115E is determined (e.g., by monitor component 122) to have NOT been met. Per FIG. 2B, step 2B, operating conditions of system 110 have been determined by monitor component 122 to have changed, with the operating conditions for file 145B, per system condition data 114E, equating to the trigger condition 115E. In response to a determination that the operating conditions of system 100A/B regarding file 145B have changed, monitor component 122 makes a determination that status 138E=YES/met, and system 110 is operating under trigger condition 115E. Accordingly, action 160E is implemented by implementation component 124 with access of file 145B expanded to users 150A-C. Monitor component 122 determines trigger condition 115D is NO longer met.

Per the foregoing, monitor component 122 can be configured to continually monitor operating conditions of system 110. For example, per step 1C, in the event of the operating conditions of system 110, regarding file 145A, return to conditions (per system condition data 114A) comparable to trigger conditions 115A, action 160A can be implemented, with all users 150A-n having access to file 145A. Monitor component 122 sets trigger condition 115A, status 138A to YES/met, and trigger condition 115C, status 138C to NO/no longer met.

In another example, per FIG. 2C, step 1D, in the event of the operating conditions of system 110, regarding file 145A, change to conditions (per system condition data 114B) comparable to trigger conditions 115B, action 160B can be implemented, with users 150A-D having access to file 145A. Trigger condition 115B can be time based, for example, a duration T1 to T2 (e.g., 10 AM to 12 PM). Monitor component 122 determines an operating time at the server 141A is at 10 AM and sets trigger condition 115B, status 138B to YES/met, trigger condition 115C to NO/no longer met, and trigger condition 115A remains with a NOT met setting. Upon reaching T2, e.g., 12 PM, monitor component 122 can be configured to analyze operation of the server 141A and identify which of the trigger conditions 115A or 115C now apply to file 145A, and further implement the action 160A or 160C defined for the respective current trigger condition 115A/115C. Hence, with time-based trigger conditions 115A-n, once the time event T2 terminates, the monitor component 122 and implementation component 124, via policy 135A, have the intelligence to identify which trigger condition 115A-n to implement and the associated action 160A-n.

3. Example Implementations

The combinations of files 145A-n, trigger events 115A-n, actions 160A-n, etc., are myriad, per the various embodiments presented herein, whereby sets and subsets of users 150A-n can be given respective access/permissions at both the file level (e.g., to a particular file 145A) as well as at the directory level (e.g., a collection of files 145A-n located in a particular database(s) 140A-n and/or particular server(s) 141A-n), further based on time limits/durations, parameters such as financial amount, system bandwidth, and the like.

In an example comparison between a conventional system and the one or more embodiments presented herein, with a conventional non-policy/non-event approach, if one or more users have been given execute permission for a file, the one or more users will always have execute permission for the file (unless permission is subsequently changed by a file administrator/owner). Hence, even in the event of a new version of the file is written, the one or more users will still have execute permission for the file (unless changed by the file administrator/owner).

However, per the various embodiments presented herein, by utilizing policies 135A-n and/or triggering events 115A-n, admin 137 can define a policy 135A such that, whenever a file 145A is modified, only a subset of potential/defined users 150A-D (in a set of users 150A-n) will have execute permission for the file 145A, and further, after a subsequent duration of time T, e.g., a 24 hour duration, has elapsed since the file 145A was modified, all of the potential/defined users (e.g., the set of defined users 150A-n) will have execute permission for the file 145A.

In another example, per the various embodiments presented herein, admin 137 can define a policy 135B regarding sharing/export of a file 145B such that all/a subset of users 150A-F only have a "read" permission for the file 145B until a particular/defined user (e.g., user 150P) reads the file 145B, whereupon, once the defined user has read the file 145B, one or more users 150A-F can be assigned a "write" permission for the file 145B. The defined user 150P accessing/reading the file 145B can function as a trigger event 115B for enabling the write permission(s) for the other users 150A-F.

In a further example, admin 137 can define a policy 135C such that a defined set of one or more users 150P-R have a write permission for a file 145C only during a defined time window T1→T2 (e.g., during 10 AM to 12 PM), while the set of one or more users 150P-R have a read permission at any time for the file 145C.

In another example, admin 137 can define a policy 135D such that access of a file 145D is limited (e.g., at an initial time T1 from file release, such as an initial 24 hours from file release), and once the defined time (e.g., the 24 hour duration at T2) has elapsed, an action 160D is triggered in the policy 135D such that a user 150Q only has, for example, read-only access or, in another example, no access. An example implementation of such policy-driven access is where file 145D is a video file that is initially available for streaming by everyone 150A-n comprising the general public, but once the defined time T1-T2 has elapsed, access to the file 145D by the general public is terminated.

In a further example, admin 137 can define a policy 135E whereby access to a file 145E is initially unlimited, but access is curtailed for all users when a monetary goal (e.g., in parameters 129A-n) is reached. Hence, policy 135E has an initial trigger condition 115E with an action 160E having unlimited access for users 150A-n, a second trigger condition 115F relates to the required monetary value being reached, with an action 160F being implemented where access for all users 150A-n is terminated.

In another example, admin 137 can define a policy 135F where access to a file 145F by all users 150A-n is only permitted when available bandwidth (e.g., where parameter 129A-n is defined at a threshold of x megabits per second/Mbps) exceeds a particular amount/threshold (initial trigger condition 115J and action 160J). In the event of the available bandwidth equals or is below the bandwidth threshold, a subsequent condition 115K is present with an action 160K limiting access to file 145F to a subset (e.g., users 150A-R) of users while the bandwidth is limited. Once the available bandwidth increases above the threshold, trigger condition 115J is again present and action 160J is reimposed.

In a further example, a policy 135G can be configured (e.g., by admin 137) such that operating condition of a first file 145A is being monitored (e.g., based on at least two trigger conditions 115A-n), however the first file 145A is linked/associated/combined with at least one other file 145B-n such that when an action (e.g., action 160G associated with a trigger condition 115G) is implemented, the action is collectively applied to the at least one other file 145B-n. Hence, a change in operating condition of the first file 145A can be used to trigger an access permission, for example, across a set of files 145A-n.

4. Methods for Configuring and Implementing Policies

FIG. 3, via flowchart 300, presents an example computer-implemented method for dynamically implementing/adjusting access permissions to one or more files, in accordance with one or more embodiments.

At 310, a policy template (e.g., policy table 130) is defined/configured with one or more policies (e.g., policies 135A-n). As previously mentioned, the respective policies can relate to one or more files (e.g., files 145A-n) having a respective initial condition (e.g., equating to initial trigger conditions 115A, 115D), alternative trigger conditions (e.g., trigger condition 115B, 115C, 115E), a trigger condition status (e.g., status 138A-n YES (met), NO (not met)), and an associated action (e.g., actions 160A-n). As previously mentioned, the policies can be defined with regard to an individual file, as well as a set of files, files located in one or more databases (e.g., databases 140A-n), files located on one or more servers (e.g., servers 141A-n), files relating to single or multiple/groups of users (e.g., users 150A-n), and such. The actions can be configured to be implemented with regard to a single user, a group of users, a single file, a set of files, files on a single database or across multiple databases, files on a single server or across multiple servers, and such. The policy template can be configured by an owner/admin of the one or more files (e.g., admin 137) via a user interface (e.g., HMI 188) in conjunction with a policy configuration component (e.g., configuration component 126).

At 320, operation of a file system (e.g., file system 110 comprising the servers 141A-n, databases 140A-n, and such) can be ongoing, whereby the file system hosts/processes the respective one or more files. A status component (e.g., status component 148) can be configured to monitor operation of the file system, and generate operational data (e.g., system condition data 114A-n) regarding any of a current or prior operating condition of the file system. The status component can be further configured to forward the operational data for analysis/review.

At 330, a monitor component (e.g., monitor component 122, first component) can be configured to monitor an operational status of a file and/or a file system on which various individual/sets of files (e.g., files 145A-n) are hosted/processed. E.g., per FIG. 2A, files 145A-B and associated servers 141A-n and databases 140A-n are being monitored by the monitor component. The monitor component can be configured to receive the operational data of the file system. In another embodiment, one or more functions performed by the status component (e.g., generation of the system condition data 114A-n) can be performed directly by the monitor component.

At 340, in response to a determination (e.g., by the monitor component) that the file (e.g., file 145A/database 140A/server 141A) is still in an initial condition, e.g., the operational status of the file is unchanged, with the trigger status (e.g., status 138A) for the trigger condition (e.g., trigger condition 115A) still being met (e.g., system condition data 114A/first system data continues to be received), method 300 can return to step 330 for further/subsequent monitoring of the operational status of the file.

At 340, in response to a determination (e.g., by the monitor component) that a new trigger condition has been met (e.g., system condition data 114C/second system data is received), method 300 can advance to step 350, whereupon, the monitor component can be configured to adjust the respective status' (e.g., status' 138A-n) to metlunmet, indicating the initial trigger condition (e.g., trigger condition 115A) is NO longer met and YES a new trigger condition has been met (e.g., per FIGS. 2A and 2B, file 145A has a new trigger condition 115C, while trigger condition 115A is no longer met/implemented).

At 360, an implementation component (e.g., implementation component 124) can be configured to identify the newly met trigger condition associated with the changed condition of the file system. The implementation component can be further configured to review the policy template and identify the action assigned to/defined for the newly met trigger condition for the file.

At 370, the implementation component can be further configured to implement the assigned action for the file. Method 300 can return to step 320 to identify any further activity regarding respective triggering conditions being met/not met for the respective files. For example, where the trigger condition is a first time (e.g., T1) of a timed period/duration during which the file can be accessed and a second time (e.g., T2) of the period after which the file cannot be accessed, the monitor component can be configured to determine the time-based trigger condition(s) is resetting to an initial trigger condition, and the implementation component is configured to apply the action of the initial trigger condition.

FIG. 4 presents an example computer-implemented method for automatically adjusting file permissions for a file, in accordance with an embodiment. At 410, the process 400 can comprise a system, comprising at least one processor (e.g., processor 182), and at least one memory (e.g., memory 184) coupled to the at least one processor and having instructions stored thereon, wherein, in response to the at least one processor executing the instructions, the instructions facilitate performance of operations, comprising: monitoring an operational state of an object (e.g., file 145A-n), wherein: a first trigger condition (e.g., trigger condition 115A) is assigned to the object, the first trigger condition is associated with a first defined action (e.g., action 160A), and an initial operational state (e.g., conditional data relating to trigger condition 115A) of the object complies with the first trigger condition; and a second trigger condition (e.g., trigger condition 115B) is assigned to the object, the second trigger condition is associated with a second defined action (e.g., action 160B). At 420, process 400 can further comprise an operation regarding, in response to determining that a change in the operational state of the object results in an operational state complying with the second trigger condition, applying the second defined action to the object. At 430, process 400 can further comprise an operation regarding controlling operation of the object based on the second defined action.

Figure 5:
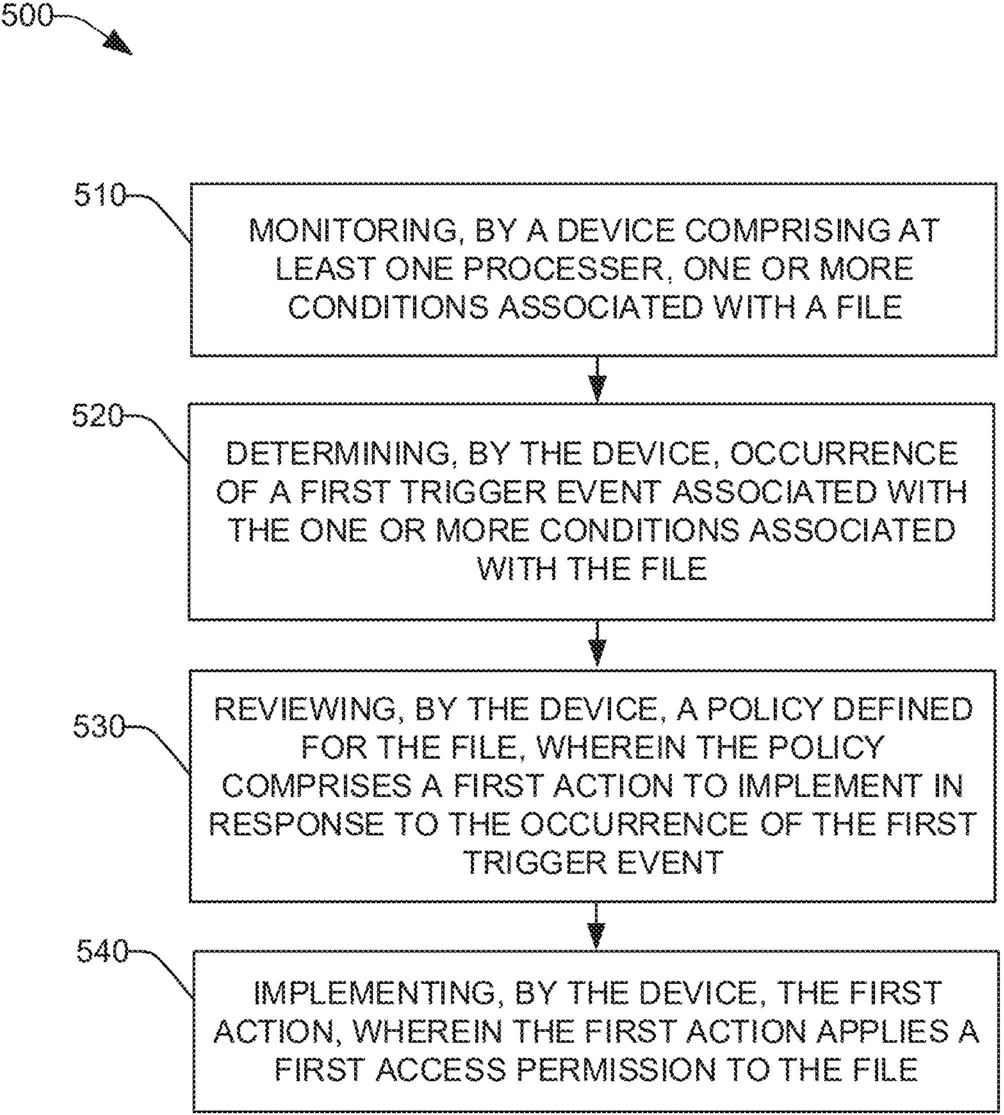
FIG. 5 presents an example computer-implemented method for automatically adjusting file permissions for a file, in accordance with an embodiment.

FIG. 5 presents an example computer-implemented method for automatically adjusting file permissions for a file, in accordance with an embodiment. At 510, the process 500 can comprise monitoring, by a device (e.g., FPS 120) comprising at least one processer (e.g., processor 182), one or more conditions (e.g., trigger conditions 115A-n) associated with a file (e.g., file 145A-n). At 520, process 500 can further comprise determining, by the device, occurrence of a first trigger event (e.g., per system condition data 114A-n) associated with the one or more conditions associated with the file. At 530, process 500 can further comprise reviewing, by the device, a policy (e.g., policy 135A-n) defined for the file, wherein the policy comprises a first action (e.g., an action 160A-n) to implement in response to the occurrence of the first trigger event. At 540, process 500 can further comprise implementing, by the device, the first action (e.g., action 160A), wherein the first action applies a first access permission to the file.

Figure 6:
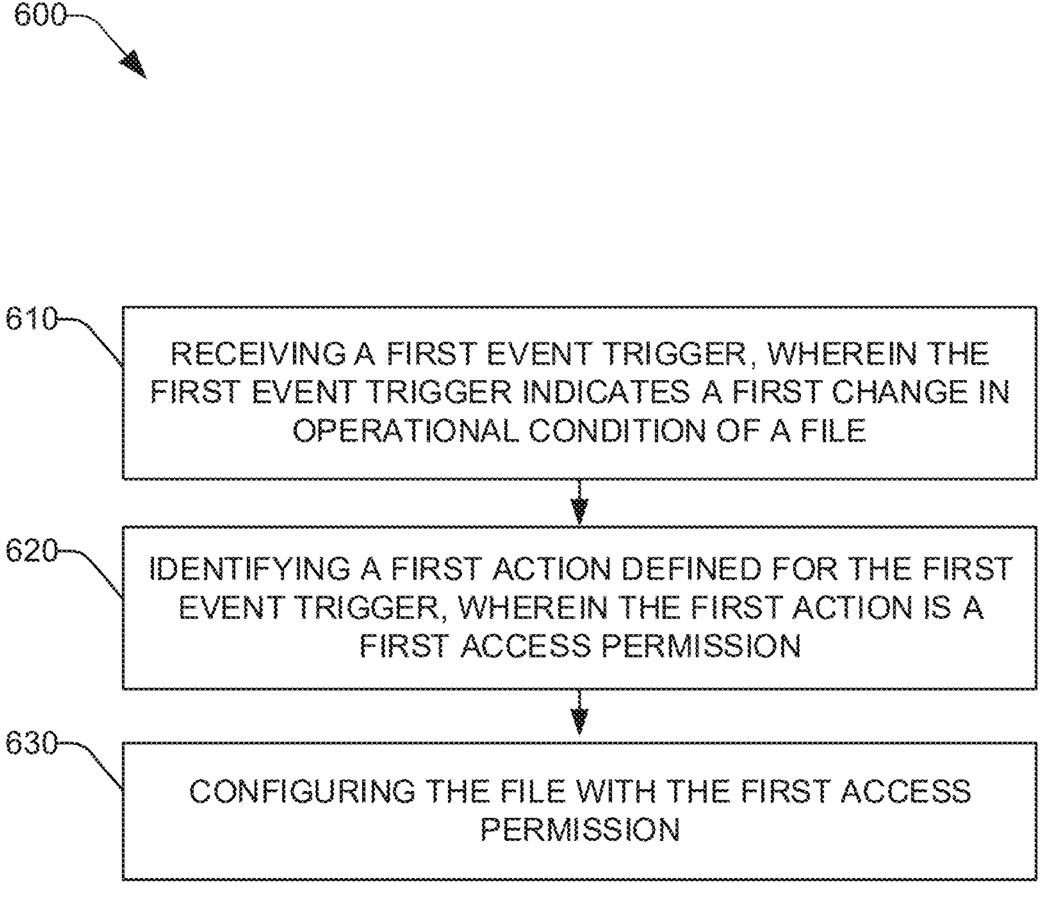
FIG. 6 presents an example computer-implemented method for automatically adjusting file permissions for a file, in accordance with an embodiment.

FIG. 6 presents an example computer-implemented method for automatically adjusting file permissions for a file, in accordance with an embodiment. At 510, the process 500 can be performed by a computer program product stored on a non-transitory computer-readable medium and comprising machine-executable instructions, wherein, in response to being executed, the machine-executable instructions cause a system (e.g., FPS 120) to perform operations, comprising receiving a first event trigger (e.g., in system condition data 114A-n), wherein the first event trigger indicates a first change in operational condition of a file (e.g., file 145A-n). At 620, process 600 can further comprise identifying a first action (e.g., action 160A) defined for the first event trigger, wherein the first action is a first access permission. At 630, process 600 can further comprise configuring the file with the first access permission.

5. Application/Implementation of AI & ML

As mentioned, the various embodiments presented herein can utilize various AI/ML model/technology/technique/architecture (e.g., process component 193 implementing processes 194A-n). AI/ML technologies and techniques can be configured to determine information, make inferences, predictions, etc., regarding implementing and configuring one or more policies 135A-n to dynamically adjust operation/access of one or more files 145A-n on a file system 110.

Processes 194A-n can include AI, ML, and reasoning techniques/technologies that employ probabilistic and/or statistical-based analysis to prognose or infer an action that an entity desires to be automatically performed for carrying out various aspects thereof, e.g., dynamically adjusting operation/access of files 145A-n based on triggered conditions 115A-n, and suchlike, which as mentioned, can be facilitated via an automatic classifier system and process.

As used herein, the terms "predict", "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or statistical-based analysis to prognose or infer an action that a user desires to be automatically performed (e.g., implementing an action 160A-n for a file 145A-n based on determining a trigger condition 115A-n, and suchlike).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (as further described below). For example, SVM's are configured via a learning or training phase within a classifier constructor and feature selection module, e.g., included in process component 193. Thus, the classifier(s) can be used to automatically learn and perform a number of functions, including but not limited to determining according to predetermined criteria, e.g., implementing an action 160A-n for a file 145A-n based on determining a trigger condition 115A-n, and suchlike.

In an example embodiment, processes 194A-n can be trained/fine-tuned with previously obtained/generated data (e.g., in historical data 195A-n, previously implemented policies 135A-n, files 145A-n (and location 140A-n/141A-), trigger conditions 115A-n, permitted users 150A-n, actions 160A-n, and such). Fine-tuning of a process 194A-n can comprise application, to processes 194A-n, of previously implemented policies 135A-n and actions 160A-n applied to files 145A-n, and suchlike. Processes 194A-n can be correspondingly adjusted by the ability of the processes 194A-n (process component 193, and any associated component across file system 110 utilizing processes 194A-n) to successfully/or unsuccessfully determine any of a previously defined policy 135A-n and associated file 145A-that corresponds, satisfies, or substantially satisfies, a similarity criterion pertaining to/determined for a current file 145*n* for which a policy 135*n* is being configured. For example, weightings in the process 194A-n are adjusted by application of the ability to accurately determine a previously defined policy 135A-n that is suitable for application with a current file 145*n*, and such. During training, prior decisions, prior observations, determinations, etc., can be applied to the processes 194A-n, enabling the processes 194A-n to be trained regarding correctly identifying a prior policy 135A-n applicable for use with a current file 145*n* to be implemented on file system 110. Accordingly, when new information is provided (e.g., implementing policies 135A-n, processing of files 145A-n, identifying triggers 115A-n, applying actions 160A-n, and suchlike), processes 194A-n can be retrained accordingly.

In an example, processes 194A-n can be configured to be implemented by the policy configuration component 126 to assist with defining a new policy 135*n* for one or more files 145A-n. Processes 194A-n can be utilized to review previously defined policies 135A-n, files 145A-n a policy 135A-n was defined for, users 150A-n, triggering events 115A-n, actions 160A-n, etc., to determine, a policy 135A-n to be implemented for a currently considered file 145A-n. The currently considered file 145*n* may be owned by an entity for which a previously processed file 145P was also owned by the same entity, a previously implemented policy 135P defined for previously processed file 145P, with processes 194A-n recommending the policy 135P for implementation with currently considered file 145*n*.

It is to be appreciated that the various processes 194A-n and operations presented herein are simply examples of respective AI and ML operations and techniques, and any suitable technology can be utilized in accordance with the various embodiments presented herein. In an example embodiment, process component 193/processes 194A-n can be applied to any of previously implemented policies 135A-n, files 145A-n, triggers 115A-n, actions 160A-n, etc., in historical data 195A-n, and such. Wherein, process component 193/processes 194A-n can include a vector component to apply any suitable vectoring technology, such as, in a non-limiting list, bag of words (BOW) text vectors, Euclidean distance, cosine similarity, vector representation via term frequency-inverse document frequency (tf-idf) capturing term/token frequency (e.g., common terms across prior/current/future knowledge), neural network embedding layer vector representation of terms/categories (e.g., common terms having different tense), a transformer neural network, bidirectional and auto-regressive transformer (BART) model architecture, a bidirectional encoder representation from transformers (BERT) model, long short term memory network (LSTM) operation(s), a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, regular pattern expression matching, and suchlike. Language models, LSTMs, BARTs, etc., can be formed with a neural network that is highly complex, for example, comprising billions of weighted parameters.

Accordingly, in an embodiment, implementation of file system 110 and included/associated components, with processes 194A-n, enables natural language processing (NLP) (e.g., utilizing vectors) to identify a previously configured policy 135A-n that is comparable to a policy 135A-n that is currently being configured, e.g., by admin 137.

During application of processes 194A-n, vector representations $V_{1-n}$ can be applied to any of prior and current policies 135A-n, files 145A-n, triggers 115A-n, actions 160A-n, etc., in historical data 195A-n, etc., such that vector similarity operations (e.g., vector clustering/distancing) can be applied to recommend a policy 135A-n for implementation with a file 145A-n. The degree of similarity (e.g., via similarity indexes $S_{1-n}$) between respective information can be determined, for example, based on a threshold reflecting a proximity of a first vector generated from information pertaining to identifying a policy 135A-n for controlling operation of files 145A-n, e.g., via vector quantization, of policies 135A-n, files 145A-n, triggers 115A-n, actions 160A-n, etc., in historical data 195A-n.

6. Example Environments of Use

Figure 7:
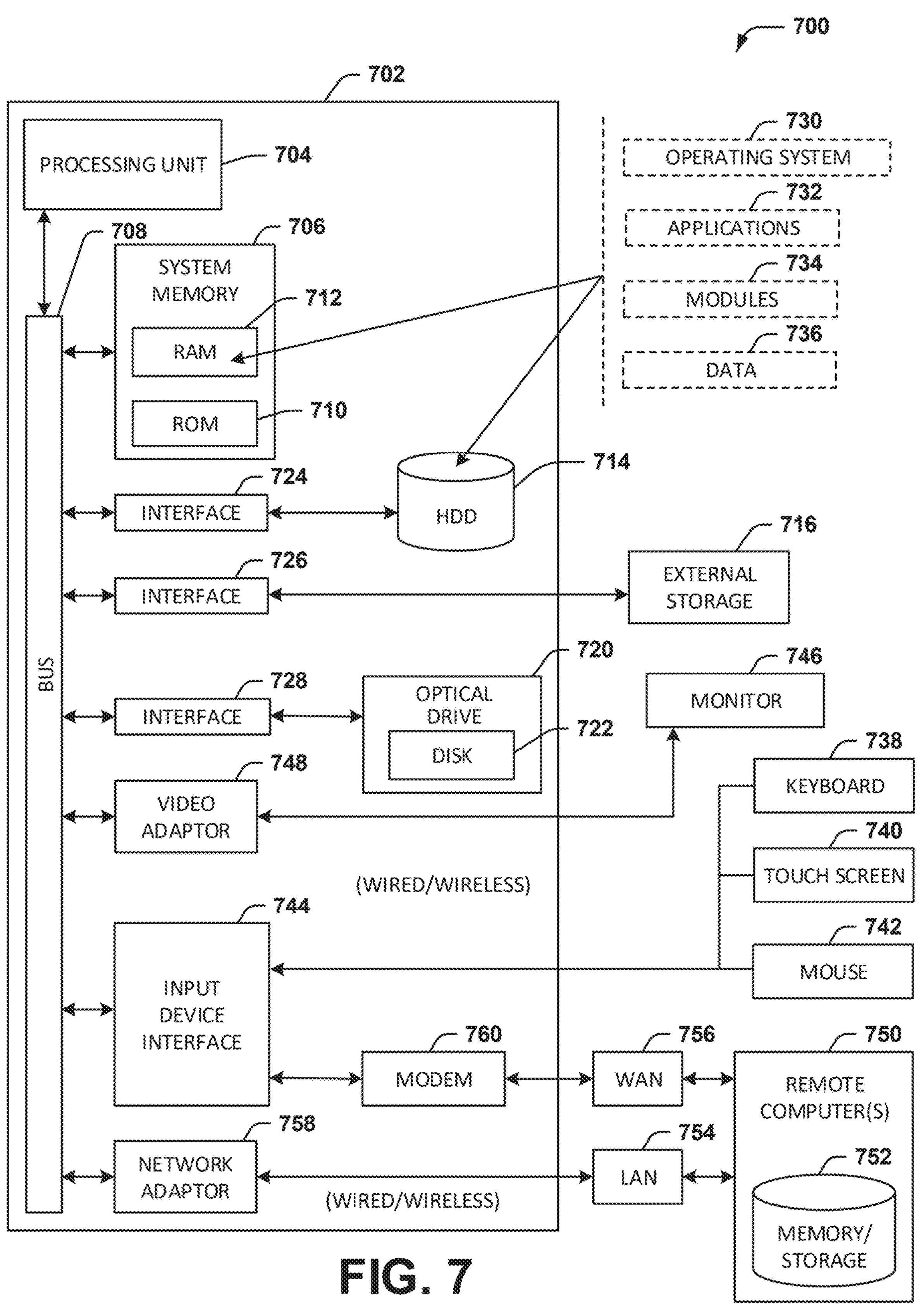
FIG. 7 illustrates an example wireless communication system, in accordance with one or more embodiments described herein.
Figure 8:
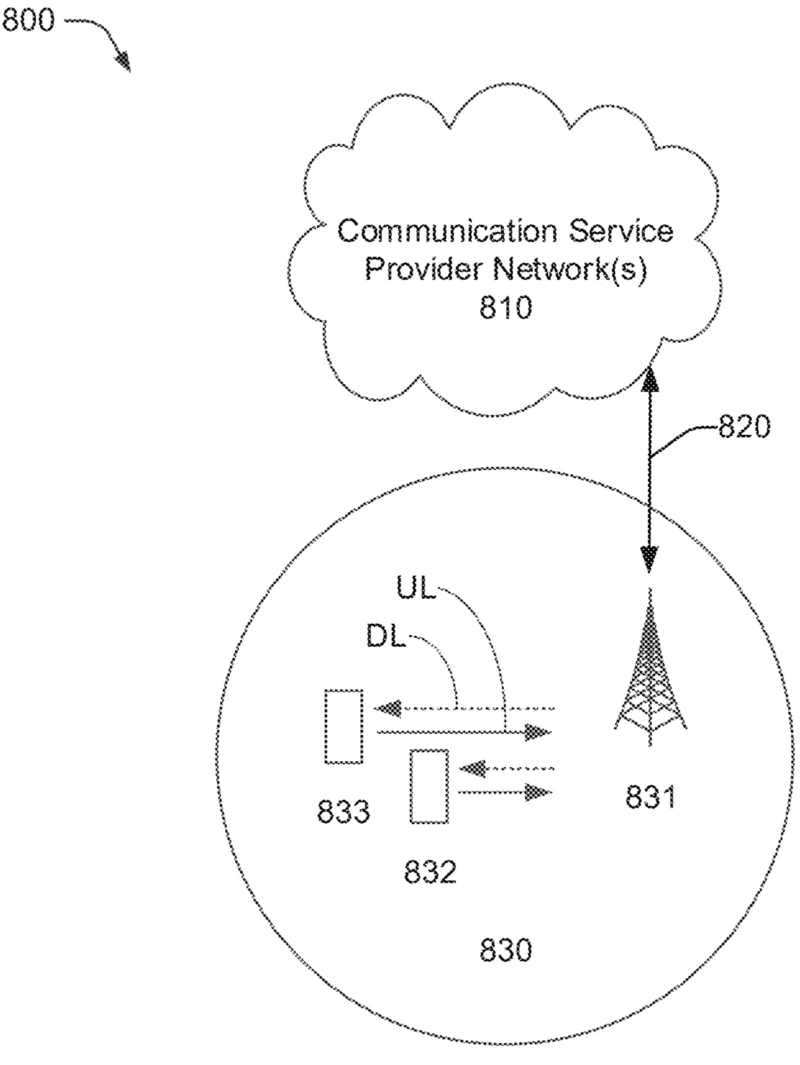
FIG. 8 presents an example environment for implementing various embodiments presented herein.

Turning next to FIGS. 7 and 8, a detailed description is provided of additional context for the one or more embodiments described herein with FIGS. 1-6.

In order to provide additional context for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 750 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 750 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 702, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are examples and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 8 illustrates an example wireless communication system 800, in accordance with one or more embodiments described herein. The example wireless communication system 800 comprises communication service provider network(s) 810, a network node 831, and user equipment (UEs) 832, 833. A backhaul link 820 connects the communication service provider network(s) 810 and the network node 831. The network node 831 can communicate with UEs 832, 833 within its service area 830. The dashed arrow lines from the network node 831 to the UEs 832, 833 represent downlink (DL) communications to the UEs 832, 833. The solid arrow lines from the UEs 832, 833 to the network node 831 represent uplink (UL) communications.

In general, with reference to FIG. 8, the non-limiting term "user equipment" can refer to any type of device that can communicate with network node 831 in a cellular or mobile communication system 800. UEs 832, 833 can have one or more antenna panels having vertical and horizontal elements. Examples of UEs 832, 833 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 832, 833 can also comprise IoT devices that communicate wirelessly.

In various embodiments, system 800 comprises communication service provider network(s) 810 serviced by one or more wireless communication network providers. Communication service provider network(s) 810 can comprise a "core network". In example embodiments, UEs 832, 833 can be communicatively coupled to the communication service provider network(s) 810 via a network node 831. The network node 831 can communicate with UEs 832, 833, thus providing connectivity between the UEs 832, 833 and the wider cellular network. The UEs 832, 833 can send transmission type recommendation data to the network node 831. The transmission type recommendation data can comprise a recommendation to transmit data via a closed loop multiple input multiple output (MIMO) mode and/or a rank-1 precoder mode.

Network node 831 can have a cabinet and other protected enclosures, computing devices, an antenna mast, and multiple antennas for performing various transmission operations (e.g., MIMO operations) and for directing/steering signal beams. Network node 831 can comprise one or more base station devices which implement features of the network node. Network nodes can serve several cells, depending on the configuration and type of antenna. In example embodiments, UEs 832, 833 can send and/or receive communication data via wireless links to the network node 831.

Communication service provider networks 810 can facilitate providing wireless communication services to UEs 832, 833 via the network node 831 and/or various additional network devices (not shown) included in the one or more communication service provider networks 810. The one or more communication service provider networks 810 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 800 can be or comprise a large-scale wireless communication network that spans various geographic areas. According to this implementation, the one or more communication service provider networks 810 can be or comprise the wireless communication network and/or various additional devices and components of the wireless communication network (e.g., additional network devices and cell, additional UEs, network server devices, etc.).

The network node 831 can be connected to the one or more communication service provider networks 810 via one or more backhaul links 820. The one or more backhaul links 820 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 820 can also comprise wireless link components, such as but not limited to, line-of-sight (LOS) or non-LOS links which can comprise terrestrial air-interfaces or deep space links (e.g., satellite communication links for navigation). Backhaul links 820 can be implemented via a "transport network" in some embodiments. In another embodiment, network node 831 can be part of an integrated access and backhaul network. This may allow easier deployment of a dense network of self-backhauled 5G cells in a more integrated manner by building upon many of the control and data channels/procedures defined for providing access to UEs 832, 833.

Wireless communication system 800 can employ various cellular systems, technologies, and modulation modes to facilitate wireless radio communications between devices (e.g., the UEs 832, 833 and the network node 831). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 800 can operate in accordance with any 5G, next generation communication technology, or existing communication technologies, various examples of which are listed supra. In this regard, various features and functionalities of system 800 are applicable where the devices (e.g., the UEs 832, 833 and the network node 831) of system 800 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 800 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities. The terms "set" and "group" are used interchangeably herein.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G, O-RAN, or other generation networks, the disclosed aspects are not limited to 5G or O-RAN implementations, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory coupled to the at least one processor and having instructions stored thereon, wherein, in response to the at least one processor executing the instructions, the instructions facilitate performance of operations, comprising:

monitoring conditions associated with a file, wherein the file has an associated defined policy, wherein the associated defined policy specifies a group of actions, wherein a first action of the group of actions is associated with a first condition of the conditions and a second action in the group of actions is associated with a second condition of the conditions, and wherein the first condition is an initial condition of the file comprising a first access permission to the file;

determining occurrence of a first trigger event associated with the conditions associated with the file;

identifying, in the associated defined policy, that the first trigger event is associated with the second condition;

identifying, in the associated defined policy, that the second condition is associated with the second action, wherein the second action applies a second access permission to the file, and wherein the second access permission is less restrictive than the first access permission to the file; and implementing the second action with respect to the file, as a result of which access to the file is greater than was available while the file was in the first condition.

2. The system of claim 1, wherein the file is at least one of a computer object, a computer file, a computer application, a video file, a video application, a digital music file, a digital music application, a digital image, a text file, or a data resource.

3. The system of claim 1, wherein the first trigger event is a function of at least one of a first time, a first configuration of the object, a threshold value, or a first parameter.

4. The system of claim 1, wherein the operations further comprise;

subsequent to the monitoring, applying and controlling, monitoring the operational state of the file, and in response to determining that the current operational state of the file complies with the first trigger event, applying the first action to the file, wherein the applying of the first action causes the first access permission to be reapplied to the file.

5. The system of claim 1, wherein the operations further comprise:

updating, in the defined policy, a second trigger event with a third defined action;

further monitoring the operational state of the file; and in response to determining, based on the further monitoring, that the updated second trigger event has been met, applying the third defined action.

6. The system of claim 1, wherein the instructions comprise a Daemon software application.

7. The system of claim 1, wherein the operations further comprise:

in response to determining that the operational state of the file complies with the second trigger event, applying a met status condition for the second trigger event, and an unmet status condition for the first trigger event.

8. The system of claim 1, wherein the file is a first file, the operations further comprise:

identifying an access permission policy to be created for a second file;

determining that the second file is similar to the first file according to a similarity criterion;

identifying, for the first file, the first trigger event, the first defined action, the second trigger event, and the second defined action; and generating the access permission policy for the second object, wherein the access permission policy comprises at least one of the first trigger event, the first defined action, the second trigger event, or the second defined action.

9. The system of claim 1, wherein the file is a first file and the first file is associated with at least one other file other than the first file, and, in response to the second defined action being applied to the first file, the second defined action is applied to the at least one other file associated with the first file.

10. A computer-implemented method comprising:

monitoring, by a device comprising at least one processer, conditions associated with a file, wherein the file has an associated defined policy, wherein the associated defined policy is associated with actions, wherein a first action of the actions is associated with a first condition of the conditions and a second action in the actions is associated with a second condition of the conditions, and wherein the first condition is an initial condition of the file comprising a first access permission to the file;

determining, by the device, occurrence of a first trigger event associated with the conditions associated with the file;

identifying, by the device, in the associated defined policy, that the first trigger event is associated with the second condition;

identifying, by the device, in the associated defined policy, that the second action is associated with the second condition, wherein the second action applies a second access permission to the file, and wherein the second access permission is less restrictive than the first access permission; and implementing, by the device, the second action with respect to the file, as a result of which access to the file is greater than was available while the file was in the first condition.

11. The computer-implemented method of claim 10, wherein the first access permission to the file and the second access permission to the file respectively comprise at least one of changing a user access, a file write permission, a file read permission, a file modify permission, a file save permission, or a file close permission.

12. The computer-implemented method of claim 10, wherein the file is included in a set of files, and the second action of the actions is applied to the set of files.

13. The computer-implemented method of claim 10, wherein the first trigger event comprises at least one of:

a defined user has accessed the file, a defined user has edited the file, a time event relating to the file has occurred, a maximum number of users have accessed the file, a rate of data transfer from the server hosting the file is below a threshold amount, a defined financial amount has been met, or a threshold parameter has been met.

14. The computer-implemented method of claim 10, further comprising:

further monitoring, by the device, the conditions associated with a file;

determining, by the device, occurrence of a second trigger event associated with the conditions associated with the file;

identifying, by the device, in the associated defined policy defined for the file, that the second trigger event is associated with a third condition;

identifying, by the device, in the associated defined policy, that a third action is associated with the second condition, wherein the third action applies a third access permission to the file, and wherein the third access permission is more restrictive than the second access permission; and implementing, by the device, the third action on the file, as a result of which the access to the file is reduced relative to the access that was available while the file was in the second condition.

15. The computer-implemented method of claim 10, wherein the file is at least one of a computer object, a computer file, a computer application, a video file, a video application, a digital music file, a digital music application, a digital image, a text file, or a data resource.

16. A computer program product stored on a non-transitory computer-readable medium and comprising machine-executable instructions, wherein, in response to being executed, the machine-executable instructions cause a system to perform operations, comprising:

monitoring conditions associated with a file, wherein the file has an associated defined policy, wherein the associated defined policy comprises a plurality of actions, wherein a first action of the plurality of actions is associated with a first condition of the conditions and a second action in the plurality of actions is associated with a second condition of the conditions, and wherein the first condition is an initial condition of the file comprising a first access permission to the file;

receiving a first event trigger associated with the conditions associated with the file, wherein the first event trigger indicates a change in operational condition of the file;

identifying, in the associated defined policy, that the first event trigger is associated with the second condition;

identifying in the associated defined policy, that the second action is associated with the second condition, wherein the second action applies a second access permission to the file, and wherein the second access permission is less restrictive than the first access permission; and implementing the second action with respect to the file, as a result of which access permissions to the file are greater than were available while the file was in the first condition.

17. The computer program product according to claim 16, wherein the operations further comprise:

receiving a second event trigger associated with the conditions associated with the file, wherein the second event trigger indicates a subsequent change in operational condition of the file;

identifying in the associated defined policy, the first action is defined for the second event trigger, wherein the first action is associated with the first access permission, wherein the first access permission is more restrictive than the second access permission; and configuring the file with the first access permission.

18. The computer program product according to claim 17, wherein the first event trigger or the second event trigger is one of:

a defined user has accessed the file, a defined user has edited the file, a time event relating to the file has occurred, a maximum number of users have accessed the file, a rate of data transfer from the server hosting the file is below a threshold amount, a defined financial amount has been met, or a threshold parameter has been met.

19. The computer program product according to claim 17, wherein:

the first access permission or the second access permission comprises a first specification that a user of a defined number of users is able to access the file, a second specification that no users are able to access the file, or a third specification that one or more users are able to access the file for a defined period of time.

20. The computer program product according to claim 16, wherein the file is at least one of a computer object, a computer file, a computer application, a video file, a video application, a digital music file, a digital music application, a digital image, a text file, or a data resource.

* * * * *